United States Patent [19]
McDonald et al.

[11] Patent Number: 4,878,575
[45] Date of Patent: Nov. 7, 1989

[54] VIBRATORY FEEDER FOR ELASTOMERIC COMPONENTS

[75] Inventors: Walter McDonald, Newton; Norbert J. Seitel, Gillette, both of N.J.

[73] Assignee: Norwalt Design, Inc., Randolph, N.J.

[21] Appl. No.: 292,402

[22] Filed: Dec. 30, 1988

[51] Int. Cl.$^4$ ............................................. B65G 27/00
[52] U.S. Cl. ................................... 198/391; 198/392; 198/443; 221/167; 221/200
[58] Field of Search ............... 198/396, 392, 391, 453, 198/443; 221/167, 171, 200

[56] References Cited

U.S. PATENT DOCUMENTS

| | | | |
|---|---|---|---|
| 3,707,217 | 12/1972 | Sharbon | 198/392 X |
| 4,138,009 | 2/1979 | Strong | 198/396 |
| 4,214,656 | 7/1980 | McDonald et al. | 198/396 X |
| 4,401,203 | 8/1983 | McDonald et al. | 198/396 X |

FOREIGN PATENT DOCUMENTS 1313632 5/1987 U.S.S.R. .............................. 198/392
1333532 8/1987 U.S.S.R. .............................. 198/443

Primary Examiner—Robert J. Spar
Assistant Examiner—Cheryl L. Gastineau
Attorney, Agent, or Firm—Klauber & Jackson

[57] ABSTRACT

Apparatus is provided for accepting an initially presented population of randomly oriented articles formed from a soft elastomeric material, and providing a high-speed output stream, wherein all said articles are commonly oriented for further mechanical manipulation. The apparatus includes an input bowl for accepting the articles, which bowl includes a rotatable central disk for feeding objects incident thereupon to the periphery of the disk. A continuous wall member extends upwardly from the disk periphery about a major arced zone. An output section defined adjacent the periphery of the disk at the portion opposed to the arced zone receives and delivers the articles from the disk, and an arrangement is provided for causing the disk to undergo vibratory motions while it is rotated.

9 Claims, 4 Drawing Sheets

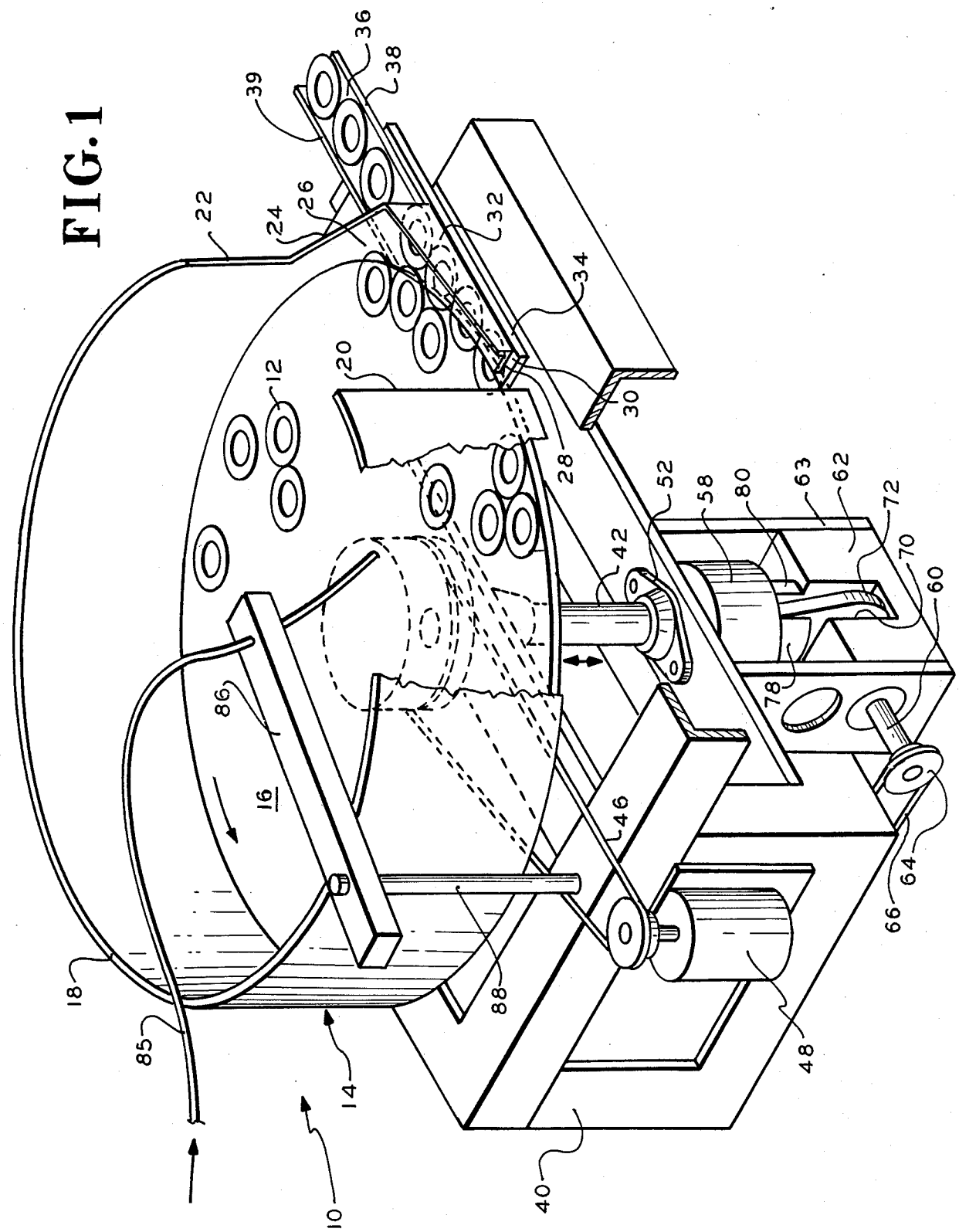

VIBRATORY FEEDER FOR ELASTOMERIC COMPONENTS

FIELD OF THE INVENTION

This invention relates generally to apparatus for accepting an initially presented population of randomly oriented articles and providing a high-speed output stream wherein all the articles are commonly oriented for further mechanical manipulation, and is more particularly concerned with such feeding apparatus suitable for use with objects made from elastomeric materials, and the like.

BACKGROUND OF THE INVENTION

In numerous applications of processing apparatus, it is necessary to orient objects in a common direction and to feed them as a high-speed stream for further mechanical manipulation and use. For this purpose, rotating feeders have been provided which rely largely on centrifugal force to orient the objects being handled. An example of apparatus requiring such feeders is found in prior U.S. Pat. No. 4,055,455 of the present inventors, which apparatus is useful in lining and testing container closures such as caps or the like. The caps or closures to be thereby processed, must be presented to this apparatus as an incoming stream wherein each cap is oriented with its open end facing in an upward direction, i.e., this is necessary in order that all appropriate functions of the lining and testing apparatus be performed. It will be evident, further, that in numerous other manufacturing operations, parts similarly must be oriented in common directions to enable a continuous stream for processing to be available.

To meet such requirements, various apparatus for orienting and feeding small parts, such as caps, lids, or the like, have been developed over the years. U.S. Pat. No. 4,214,656 of the present inventors, for example, is specifically directed at the cap orienting and feeding problem which has been described. In this patent, a construction is disclosed which enables increased dependability in cap orientation and also higher speed and feeding. These objectives are achieved by an arrangement which includes a feeder bowl which accepts the randomly oriented caps and feeds them from an output port in the bowl, as an in-line stream of caps oriented in a substantially horizontal plane. An inclined twisting chute extends from the output of the feeder bowl. This chute receives the in-line stream of caps and twists the plane of advance through 90°, whereby the caps are reoriented to a stream wherein the diameters are substantially in a vertical plane. A guide chute extends at an incline from the twisting chute and includes an input section for receiving the caps at the vertical orientation, an output section whereat the caps are oriented with their diameters parallel to the support surface, and a transition zone between the input and output sections, whereat the caps gravitationally tip and fall from the vertical plane to the reoriented, more nearly horizontal positions. A biasing device can be used in conjunction with this arrangement for biasing the tipping of the caps so that they fall with their open ends facing in an upward direction.

Thus, rotating feeders are well-known devices used in the art for feeding individual units from a population of such units to a processing apparatus or for discharging them in aligned relationship of such units onto a moving conveyor, or the like. Such feeders are commonly used in the pharmaceutical industry, in the bottling field, in the electronics industry, and in many other fields where individual small components in a population of such components are desired to be discharged individually and in aligned relationship.

While is has been found that no particular difficulty is experienced when dealing with components made from a relatively hard, frictionless material are involved, there has been considerably difficulty in using rotating feeder techniques for discharging items formed from soft materials which exhibit a relatively high coefficient of friction, such as materials formed from elastomeric substances, viz. rubber, artificial rubbers, various rubber-like polymers, and the like. Examples of articles which need to be individually segregated and fed from a random population, are washers formed from soft rubber or synthetic elastomeric materials. Difficulties are experienced with conventional feeders such as referred to above when attempts are made to handle such articles in them.

OBJECTS OF THE INVENTION

It is, accordingly, an object of the invention to provide an improved rotating feeder construction.

It is another object of the invention to provide an improved rotating feeder construction which is particularly adapted for handling and feeding components formed from soft elastomeric materials.

SUMMARY OF THE INVENTION

In accordance with the present invention, apparatus is provided for accepting an initially-presented population of randomly-oriented articles formed from a soft elastomeric material and providing a high-speed output stream, wherein all of said articles are commonly oriented for further mechanical manipulation.

The apparatus of the invention comprises an input bowl for accepting the population of articles to be distributed. The bowl has a disk-shaped base or bottom which is rotatably mounted and means are provided for rotating it at variable speeds. In addition to the substantially planar disk-shaped rotatable base or bottom the bowl also comprises a fixed peripheral upstanding wall which extends almost entirely around the circumference of the bottom, i.e., along a major arced zone, except for a discharge area or output section wherein the articles being processed are discharged in linearly-aligned relationship onto a discharge apron or chute. The output section defined adjacent the periphery of the disk at the portion opposed to the arced zone receives and delivers the articles from the disk. It is a feature of the invention that the disk-shaped bottom of the bowl is not only rotatably mounted but it is also mounted for simultaneous vibratory movement along the axis of rotation so that the bowl bottom receives, when in operation, not only a rotary movement but also an axial vibratory movement, all at the same time. It has been found that this combination of movements makes possible rapid separation of articles from a random population of the articles into a linearly-aligned stream even though the articles are formed from a soft, elastomeric material which exhibits a high coefficient of friction when placed upon a supporting surface. The frequency of the axial vibratory movement can be varied and, in a preferred embodiment of the invention, the amplitude of the axial vibratory movement an also be varied.

BRIEF DESCRIPTION OF THE DRAWINGS

The invention is diagrammatically illustrated, by way of example, in the drawings appended hereto, in which:

FIG. 1 is a perspective view, partially cut away to show details of construction, of an article-feeding apparatus embodying features of the present invention;

DETAILED DESCRIPTION OF THE PREFERRED EMBODIMENT

Figure 1A:
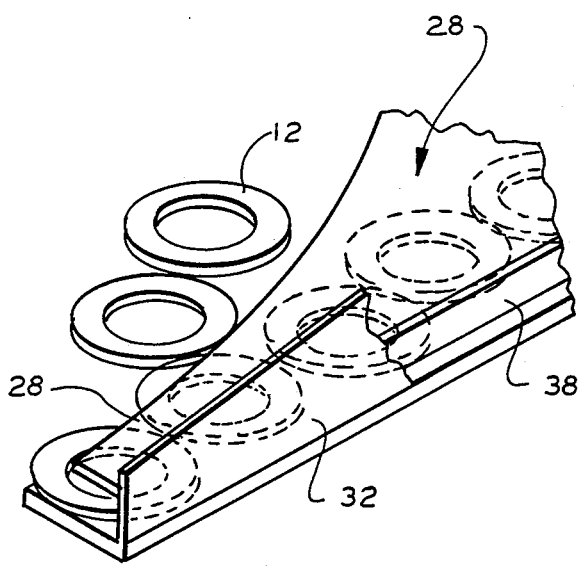
FIG. 1A is an enlarged detail of the discharge port and associated chute of the apparatus shown in FIG. 1.

Referring now to FIG. 1, the reference numeral 10 designates generally apparatus constructed in accordance with the invention and useful especially in connection with the orientation and feeding of articles formed from soft, elastomeric materials, and parts or components 12. These components 12 are characteristic of the type of articles with which the present apparatus is intended to be utilized. There is, however, no intention in any way to limit the use of the apparatus with respect to particular types of articles such as articles 12, which are shown only for purposes of illustration. It can be pointed out that in other typical applications articles 12 can comprise closures or container caps. It is intended, however, that numerous other articles having similar soft, elastomeric characteristics are capable of being handled and thus, for purposes of FIG. 1, it primarily is to be considered that a collection or population of randomly arranged such articles are intended for initial feed to the input bowl, designated at 14, with the objective being of providing an output feed wherein the discharged articles are oriented in a common linear direction, in this instance in a single file. Thus, the bowl 14 comprises a rotatable bottom in the form of a disk 16 enclosed by a stationary wall 18 which extends along almost the entire periphery of disk 16, i.e., along a major arced zone, having an end edge 20 and a partial end edge 22. Extending from edge 22 is an arm 24 which is shaped to define a continuing low wall portion 26 and a horizontal portion 28 or dead plate parallel to but spaced from rotatable disk 16 which defines the bowl bottom, to define the top of a slot 30 into which the articles 16 are discharged by centrifugal force when bottom 16 is rotated and the articles leave the bowl one-by-one in linearly aligned relationship. The arm 24 is also shaped to define a rim 32. Underlying horizontal portion 28 is a platform member 34 which carries a discharge chute 36 which has a first side flange 38 and a second side flange 39 to hold the articles 16 aligned on the chute. The base of the chute is co-planar with the bowl bottom 16 when the apparatus is at rest and cooperates with the bowl bottom 16 and the horizontal portion 28 of arm 24 to define the above-mentioned slot 30 for receiving articles 12 as they leave bowl bottom 16 after they pass edge 20 which, in effect, provides a discharge port for the bowl 14, which permits the articles 12 to escape from the periphery of disk 16 and enter onto chute 36 for discharge, one pushing the other along the chute.

Figure 2:
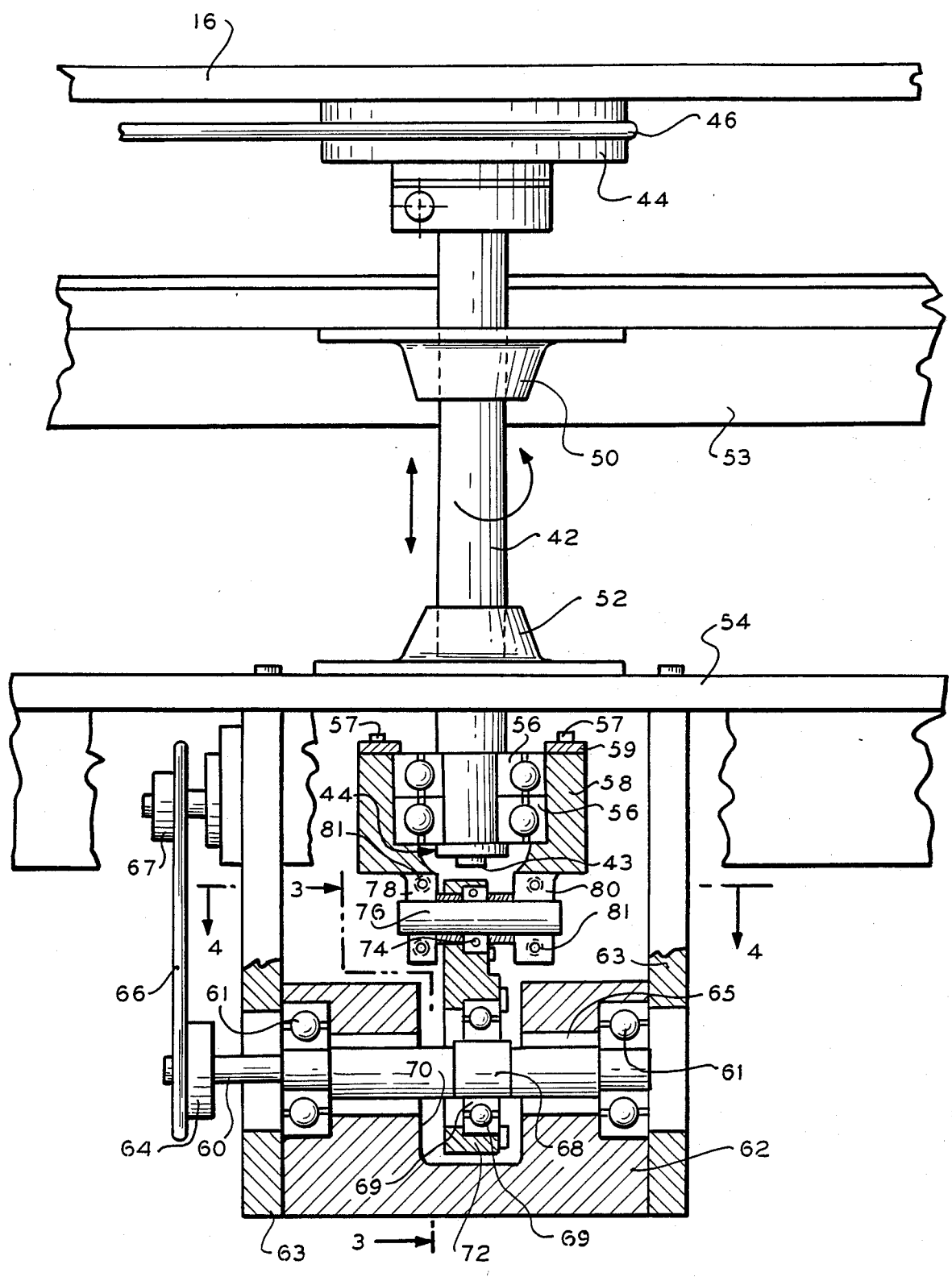
FIG. 2 is an enlarged side elevation, partially in section of a portion of the apparatus shown in FIG. 1, showing details of construction.
Figure 3:
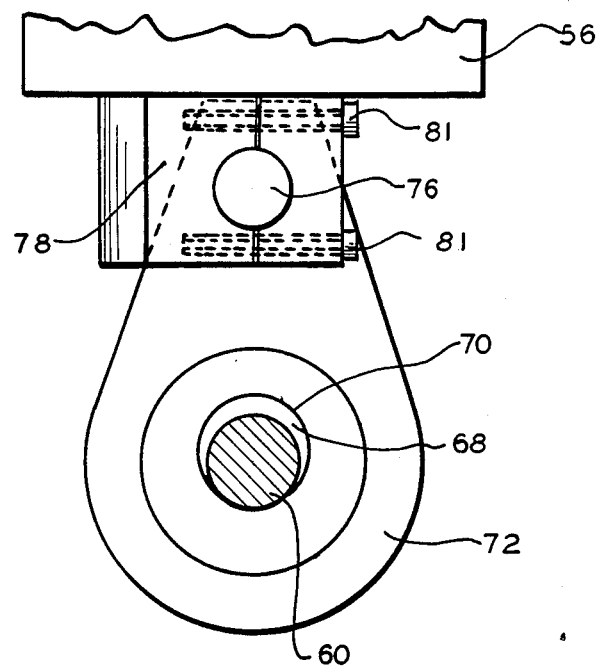
FIG. 3 is a side elevational view, partially in section, taken approximately along the line 3-3 of FIG. 2.
Figure 4:
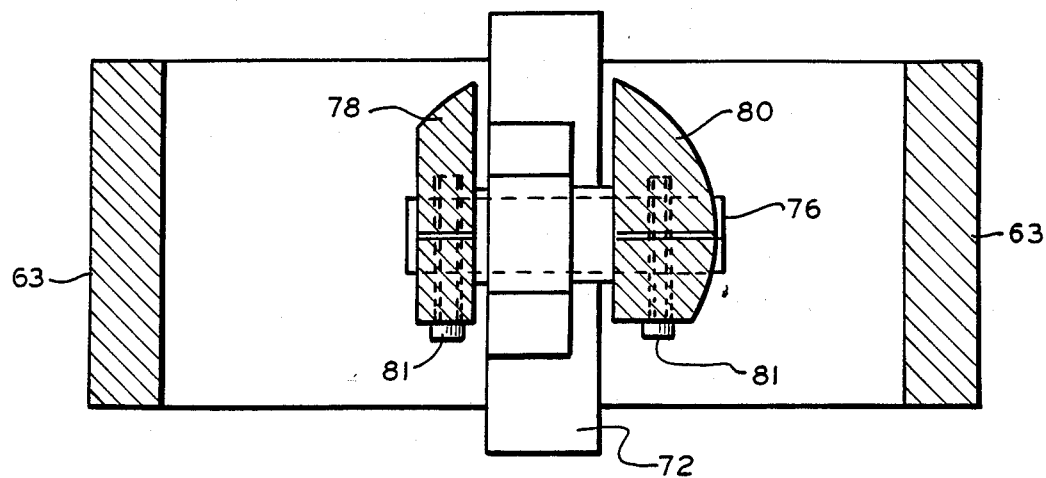
FIG. 4 is a sectional view taken approximately along the line 4—4 of FIG. 2.

The apparatus 10 further comprises a frame 40 in which the moving parts of the apparatus are supported and to which the stationary parts of the apparatus, such as the bowl wall 18, are attached, e.g., by metal strips (not shown) as seen in U.S. Pat. No. 4,401,203 of the present applicants. Thus, the rotatable bowl bottom 16 is carried at its center by a vertical shaft 42 which shaft carries at its upper end a pulley 44 adjacent bottom 16. Pulley 44 is turned, via a belt 46, by a variable-speed motor 48, also mounted on frame 40, which causes the shaft 42 and thus the bowl bottom 16 to rotate at any desired speed. The shaft 42 is rotatably supported in flange bearings 50 and 52 (FIG. 2) secured to frame members 53 and 54, respectively, and the lower end of shaft 42 is rotatably carried by bearings 56 fixedly mounted in a cylindrical housing or cage 58 in which the shaft 42 is free to rotate. The shaft 42 is held in position with respect to bearing 56 by means of a screw 43 threaded into the lower end of shaft 42 and an underlying washer 44, as seen in FIG. 2. In turn, the bearings 56 are held in place in similar manner by screws 57 and underlying washer 59, also seen in FIG. 2.

In accordance with the invention, the shaft 42 is induced to undergo axial vibrations while it is rotated, e.g., by belt 46 and motor 48, and these vibrations, in turn, cause the bowl bottom or disk 16 to undergo the same vibrations, since the latter is firmly mounted atop shaft 42. For this purpose, there is provided a shaft 60 which is rotatably mounted in bearings 61 which are seated in appropriate recesses at the ends of a block 62 which is disposed between two plates 63 extending downwardly from frame 40. At the left end of shaft 60 as seen in FIG. 2 is secured a pulley 64 which is driven, to rotate shaft 60, by a belt 66 from a variable-speed motor 67, also conveniently mounted on frame 40. Shaft 60 extends through an aperture 65 in block 61. At its center, shaft 60 carries an eccentric cam 68 seated, together with a surrounding bearing 69, in a recess 70 formed at the center of block 61. Mounted upon bearing 69 carried by shaft 60 is a cam follower arm 72. In turn, cam follower arm 72 carries a bearing 74 which surrounds a pin 76 and thus movably supports the cam follower arm 72 on pin 76 so that cam follower arm 72 is in the nature of a crank arm. The ends of pin 76 are fixedly carried by pairs of arms 78 and 80 which extend downwardly from the bottom of housing or cage 58 and the pin 78 is rigidly clamped in place by means of four screws 81. It will thus be seen that, when shaft 60 is rotated, with simultaneous rotation of cam 68, cam follower 72 will oscillate on pin 76 and at the same time will cause pin 76 to undergo a vertical reciprocatory movement corresponding to the eccentricity of the cam 68. This in turn will cause the housing or cage 58 to undergo a corresponding movement which will be translated into an axial vibrational movement of bowl bottom or disk 16.

It will be understood that the slot 30 is dimensioned so that is will accommodate the movements of bowl bottom or disk 16 and yet limit passage of a single article 12 at a time so that the articles 12 will be discharged from bowl 14 on chute 36 one-at-atime and will leave in single file, aligned relationship.

Figure 5:
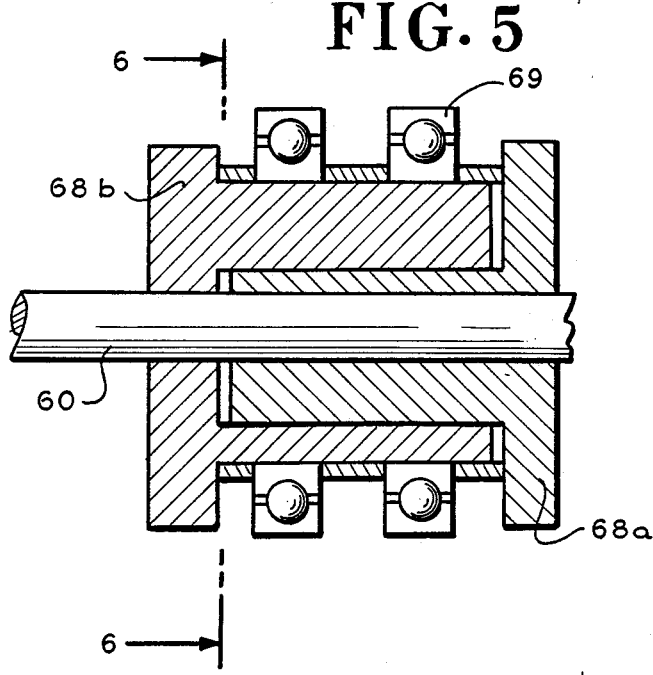
FIG. 5 is a sectional view of another embodiment of the eccentric shown in FIG. 1.
Figure 7:
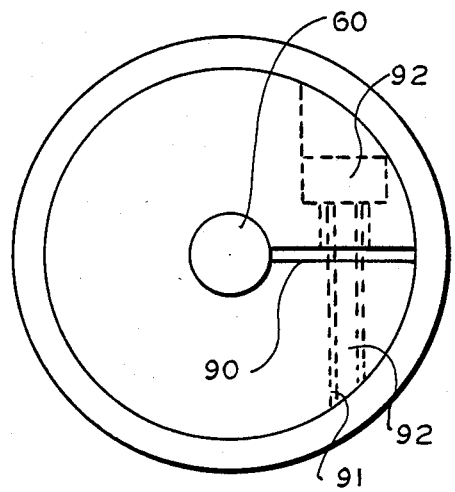
FIG. 7 is a side elevational view of FIG. 5.
Figure 6:
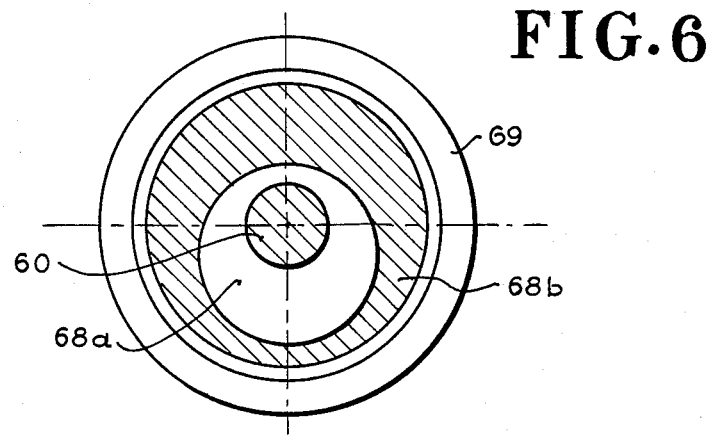
FIG. 6 is a sectional view taken approximately along the line 6—6 of FIG. 5.

As previously mentioned, variable speed motors are used to rotate bowl bottom 16 and shaft 60 so that the speed of rotation and the frequency of the vibratory movement of bowl bottom 16 can be readily regulated. It may also be desirable to regulate the amplitude of the vibratory movement of bowl bottom 16. For this purpose, reference is made to FIGS. 5, 6 and 7 which show a modified form of cam construction which acts upon shaft 42. Thus, referring to FIG. 5, the shaft 60 carries a cam which is divided into two parts, viz. an inner section 68a and an outer concentric section 68b. By selectively turning cam sections 68a and 68b relatively to one another, various degrees of eccentricity of the outer surface of outer section 68b can be achieved. In order to clamp eccentric section 68a and 68b are rigidly on shaft 60, the eccenric sections 68a and 68b are formed with radial slots 90 (see FIG. 7) and are formed with a tapping 91 extending across the slot in which is received a threaded screw or bolt 92. Turning of the screw 92 will cause the slot 90 to close and squeeze the eccentric section upon shaft 60 so that a rigid relationship is established between the eccentric sections and shaft 60 after the eccentric sections have been rotated relatively to one another the desired amounts.

While the vibratory movement of shaft 42 as a result of the system above described acted upon by the cam carried by shaft 60 is generally effective to permit free flow of articles 12 on disk 16 and into chute 36, on occasion it may be desirable to assist the movement of articles 12.

For this purpose, as seen in FIG. 1, there is provided a flexible tube 85 through which an air jet may be passed. The air jet can be directed against any of the articles 12 as they are being discharged from bowl 14 to assist their outward movement. The tube 85 is conveniently supported in a bracket 86 which is mounted adjacent one end on a vertical support 88 mounted on frame 40. During use of apparatus, the articles 12 to be oriented are deposited en mass upon the upwardly facing surface of disk 16 which is rotating in the direction indicated by the arrow at a relatively rapid speed, in consequence of being driven by motor 48 through belt 46. Centrifugal forces acting upon the individual articles 12 drive the articles outwardly, and the continued rotation of the disk 16 combined with the vibratory motion caused by cam 68 through shaft 42 causes the articles 12 to ride upon the disk periphery about the bowl riding in sliding contact with sidewall 32. This type of action can be seen with the articles in FIG. 1.

Toward the right side of FIG. 1 can be seen the output section. As previously mentioned, this output section is adjacent the periphery of disk 16 at the portion thereof which is opposed to the arced zone defined by wall 18, i.e., the output section adjoins the minor arc between 20 and 22 on the disk. At this portion of the feed bowl, the cut in the wall permits articles, which advance about the disk in the direction of rotation exit the bowl, i.e., to depart from the disk at approximately the end 20 of wall 18.

It will be understood that various changes and modifications may be made in the invention without departing from the scope of the appended claims.

For example, the means for vibrating the disk can be electromagnetic appropriately energized and de-energized. Typically, the vibrations induced have a relatively small amplitude, e.g. 0.005 to 0.05 inches, and vibration frequencies are suitably generally of the order of 1800 to 7200 per second, although these values can be greater or smaller, Other means for effecting the desired vibrations will be apparent to persons skilled in the art.

It is intended, therefore, that all matter contained in the foregoing description and in the drawings shall be interpreted as illustrative only and not in a limiting sense.

We claim:

1. Apppartus for accepting an initially presented population of random articles formed from soft polymeric material, and providing a high speed output stream, wherein all said articles are commonly oriented for further mechancal manipulation; said apparatus comprising:
    an input bowl for accepting said articles, said bowl including a rotatably central disk for feeding said articles rendered incident thereupon to the periphery of said disk;
    a continuous wall member rising upwardly from a point adjacent the periphery of said disk and extending about a major arced zone of said disk;
    an output section for delivering said articles from said disk, said output section being defined adjacent the periphery of said disk, at the portion thereof opposed to said major arced zone;
    chute means for receiving said articles from said output section;
    means for rotating said disk; and
    means for vibrating said disk during its rotation in a direction normal to the plane thereof.

2. Apparatus as defined in claim 1, further comprising a shaft supporting said disk, and means to impart oscillatory motion to said shaft along the axis thereof, for transmission to said disk.

3. Apparatus as defined in claim 2 wherein said means for imparting said oscillatory motion comprises a cam acting upon said shaft.

4. Apparatus as defined in claim 3 wherein a cage rotatably supports the free end of said shaft remote from said disk and said cam actuates said cage to impose vibratory motion to said shaft.

5. Apparatus as defined in claim 1, wherein said means for causing vibratory motion of said disk comprises a cam.

6. Apparatus as defined in claim 1, wherein said means rotating said disk is speed adjustable.

7. Apparatus as defined in claim 5 further comprising variable motive means for actuating said cam and varying the frequency of the vibratory motion of the disk.

8. Apparatus as defined in claim 5, wherein the eccentricity of said cam is adjustable.

9. Apparatus as defined in claim 5, wherein said cam is formed from two concentric parts, relative rotation of which causes the eccentricity of the cam to be varied.

* * * * *